Patented May 14, 1935

2,000,994

UNITED STATES PATENT OFFICE 2,000,994

SULPHONATED NAPHTHENIC ALCOHOL AND METHOD OF PREPARING THE SAME

Walther Schrauth, Berlin, Germany, assignor, by mesne assignments, to "Unichem" Chemikalien Handels A.-G., Zurich, Switzerland, a corporation of Switzerland No Drawing. Application October 23, 1930, Serial No. 490,821. In Germany February 26, 1930

16 Claims. (Cl. 260—99.12)

The present invention relates to sulphonated cyclic alcohols and methods of producing the same.

The invention has for an object to provide an improved product having in general the properties of the sulphonated oils and to provide an improved process for the production of such product.

It has been found according to the present invention that by the reduction of naphthenic acids, such, for example, as are produced in the alkali refining of petroleum, to produce alcohols and the sulphation or sulphonation of these alcohols products having extremely valuable properties can be produced. These products are particularly useful in the textile, leather, paper and soap industries as addition agents, wetting-out agents, emulsifying agents for water insoluble substances, impregnating agents and the like.

The naphthenic acids to be reduced may advantageously be neutralized by esterification, particularly in cases where an alkali metal in the presence of an alcoholic solvent is to be employed as the reducing agent. This preliminary esterification, however, is not essential, as the free naphthenic acids may be reduced by such reducing agents as formic acid, carbon-monoxide, and similar reducing agents, either with or without catalysts.

The raw reduction products so obtained may if desired be free from saponifiable ingredients by the usual refining processes. They are then converted into water soluble form by sulphation or sulphonation with sulphuric acid, chlorosulphonic acid or fuming sulphuric acid.

In some cases it is preferable to employ diluents during the sulphonating and/or sulphating action, such for example as carbon tetrachloride or to favour the complete conversion by addition of a dehydrating agent such as acetic anhydride which at the same time has the property of chemically fixing the water produced by the reaction. Similar effects are also obtained by the use of fuming sulphuric acid or chlorsulphonic acid.

The sulphonates and sulphates so obtained are by far superior to those generally employed such as Turkey red oil made from castor oil unsaturated fatty acids and the like, being superior not only as regards the stability of their aqueous solutions, particularly against water hardening agents, but also by reason of their wetting-out power, which causes an instantaneous penetration of the fibrous material by the dye.

In order that the invention may be well understood the following examples will be given by way of illustration only.

One part by weight of a raw commercial naphthenic acid (boiling point 90–230° C. at 13 mm. pressure) is dissolved in two parts by weight of 3% butyl alcoholic hydrochloric acid and heated to boiling for four hours. The butanol and hydrochloric acid are then distilled off and 200 kg. of the naphthenic acid so treated are reduced in an autoclave with 90 kg. of sodium and 1.000 kg. of butyl alcohol. The whole is then heated under constant agitation to 140° C. for 1½ hours. After cooling to 90° C. the reaction mass is poured into water, the underlying liquor is drawn off and the remainder is neutralized and washed several times. It is then dried over lime and the excess butyl alcohol is removed by distillation. The product so obtained boils between 70 and 230° C. at 10 mm. pressure and possesses an acetyl saponification number 175 and an iodine number 22. It is free from saponifiable components and dissolves to give a clear solution in concentrated sulphuric acid. Dilution with water produces no turbidity. The conversion of the product into the sulphuric acid derivative can be carried out in the following manner.

20 parts by weight of chlorsulphonic acid are gradually added to 50 parts of the above mentioned product and to this are subsequently added 5 parts of sulphuric acid whereupon the temperature rises to 40° C. The reaction mass is then washed with salt solution and neutralized. Upon evaporation in vacuo the sulphonate and/or sulphate is obtained in a solid grindable form.

As previously stated it is also possible to use the naphthenic acids themselves for the reduction process without previous esterification. For example 200 kg. of raw commercial naphthenic acid together with about 500 kg. of carbon monoxide or the corresponding quantity of a gas containing carbon monoxide are slowly passed over a catalyst at about 400° C. the catalyst, consisting essentially of manganese oxide and another element of group VI of the periodic system. The reduction product together with hydrogen is then passed over a second catalyst containing essentially nickel or nickel oxide at about 200° C.

The product so obtained has a high acetyl saponification number and is then treated with a sulphonating agent in the presence of acetic anhydride. After neutralization with alkali, a salt is obtained which when dry is in grindable form and which in aqueous solution shows all the properties of a Turkey red oil of high wetting-out power.

It is to be understood that the above examples are illustrative only and that various modifications may be made therein without departing from the scope of this invention.

I claim:

1. A process for the manufacture of products resembling Turkey red oils characterized in that naphthenic acids are treated with reducing agents to produce alcohols and the alcohols are reacted with sulphonating agents to convert the alcohols into water soluble sulphonic acid derivatives.

2. The sulphuric acid acid ester of naphthenic alcohol.

3. The sulphonic acid of naphthenic alcohol.

4. The process of producing a wetting-out and emulsifying agent which comprises reacting naphthenic alcohol with an acid of the group consisting of sulphuric acid, chloro-sulphonic acid and fuming sulphuric acid.

5. The process of producing a wetting-out and emulsifying agent which comprises converting naphthenic acid to the corresponding alcohol and reacting said alcohol with an acid of the group consisting of sulphuric acid, chloro-sulphonic acid and fuming sulphuric acid.

6. The process of producing a wetting-out and emulsifying agent which comprises reacting naphthenic alcohol in the presence of a diluent inert to the reaction with an acid of the group consisting of sulphuric acid, chloro-sulphonic acid and fuming sulphuric acid.

7. The process of producing wetting-out and emulsifying agent from naphthenic acid which comprises reducing raw commercial naphthenic acid to convert the carboxyl group to a hydroxyl group in the presence of a catalyst containing nickel or nickel oxide at a temperature approximating 200° C. and reacting the product so formed with an acid of the group consisting of sulphuric acid, chloro-sulphonic acid and fuming sulphuric acid.

8. The process as defined in claim 7 in which the alcohol is reacted with the acid in the presence of acetic anhydride.

9. The process of producing wetting-out, and emulsifying agent from naphthenic acid which comprises esterifying naphthenic acid with butyl alcohol and reducing the butyl naphthenate so formed to naphthenic alcohol and butyl alcohol, separating the naphthenic alcohol and reacting it with an acid of the group consisting of sulphuric acid, chloro-sulphonic acid and fuming sulphuric acid.

10. The process of producing a wetting-out and emulsifying agent which comprises esterifying naphthenic acid with butyl alcohol, reducing the esters to yield naphthenic alcohol and treating the alcohol with an acid of the group consisting of sulphuric acid, chloro-sulphonic acid and fuming sulphuric acid.

11. The process of producing sulphuric acid esters from naphthenic acids which comprises boiling for approximately four hours one part of naphthenic acid with two parts of 3% butyl-alcoholic hydrochloric acid yielding butyl naphthenate, distilling off the butyl alcohol and hydrochloric acid, reducing the butyl naphthenate to naphthenic alcohol and butyl alcohol by treatment in an autoclave with sodium and butyl alcohol, and heating the mixture at approximately 140° C. for approximately one hour and a half, separating the naphthenic alcohol by washing out the sodium butylate and distilling out the butyl alcohol and sulphating the naphthenic alcohol by treating fifty parts of naphthenic alcohol with twenty parts of chlorosulphonic acid and five parts of sulphuric acid to produce naphthenic acid sulphate.

12. The process of producing sulphuric acid esters from naphthenic acids which comprises reacting 200 parts raw commercial naphthenic acid with approximately 500 parts of carbon monoxide in the presence of a catalyst consisting essentially of manganese oxide and an element of group 6 of the periodic system at approximately 400° C. to partially reduce the acid and reacting the product further with hydrogen in the presence of a catalyst containing nickel or nickel oxide at about 200° C. to complete the reduction to alcohol, reacting the alcohol with an acid of the group consisting of sulphuric acid, chloro-sulphonic acid and fuming sulphuric acid in the presence of acetic anhydride.

13. The process of producing sulphuric acid esters from naphthenic acids which comprises partially reducing naphthenic acid with carbon monoxide and completing the reduction to naphthenic alcohol with hydrogen and sulphating the alcohol with an acid of the group consisting of sulphuric acid, chloro-sulphonic acid and fuming sulphonic acid in the presence of acetic anhydride.

14. A soluble salt of the sulphuric acid acid ester of naphthenic alcohol.

15. A soluble salt of the sulphonic acid of naphthenic alcohol.

16. A wetting-out emulsifying agent resembling Turkey red oil consisting of a mixture of sulphates and sulphonates of naphthenic alcohol.

WALTHER SCHRAUTH.